United States Patent [19]

Arnold

[11] 4,045,010
[45] Aug. 30, 1977

[54] ABUTMENT PIECE ADAPTED TO BE INSERTED IN A T SLOT OF A MACHINE TOOL TABLE

[76] Inventor: Franz Arnold, Spatzenweg 20, 8960 Kempten, Germany

[21] Appl. No.: 681,122

[22] Filed: Apr. 28, 1976

[30] Foreign Application Priority Data

May 2, 1975 Germany .................. 7514168[U]

[51] Int. Cl.² ............................................. B23Q 3/00
[52] U.S. Cl. .................................................. 269/315
[58] Field of Search ............................... 269/303–306, 269/315–319, 297–301, 291, 99, 10

[56] References Cited

U.S. PATENT DOCUMENTS

| 3,554,530 | 1/1971 | Moore | 269/301 |
| 3,704,880 | 12/1972 | Gudel | 269/315 |

Primary Examiner—Robert C. Watson
Attorney, Agent, or Firm—Blanchard, Flynn, Thiel, Boutell & Tanis

[57] ABSTRACT

An abutment piece adapted to be inserted into a T slot of a machine table and which bears against a lateral surface of the leg section of the T slot by means of an abutment surface and projects beyond the clamping surface of the machine tool table. The abutment piece has a head portion which projects beyond the clamping surface and the width thereof is greater than the slot width of the leg section. The abutment piece has a neck portion received in the T slot and the width of the neck portion is smaller than the slot width. The head portion has on its side facing away from the abutment surface a bearing surface inclined at 45° with respect to the abutment surface and extends toward the neck portion. The bearing surface engages the chamfered outer edge of the lateral surface of the leg section. A wedge element is provided on the neck portion of the abutment piece and is movable parallel to the abutment surface and perpendicularly to the head portion. A clamping screw is provided and engages the widened flange section of the T slot. The wedge surface of the wedge element, which faces the bearing surface and is inclined at an opposite angle with respect to the abutment surface is urgable against the inner edge of the corresponding lateral surface on the leg section.

6 Claims, 4 Drawing Figures

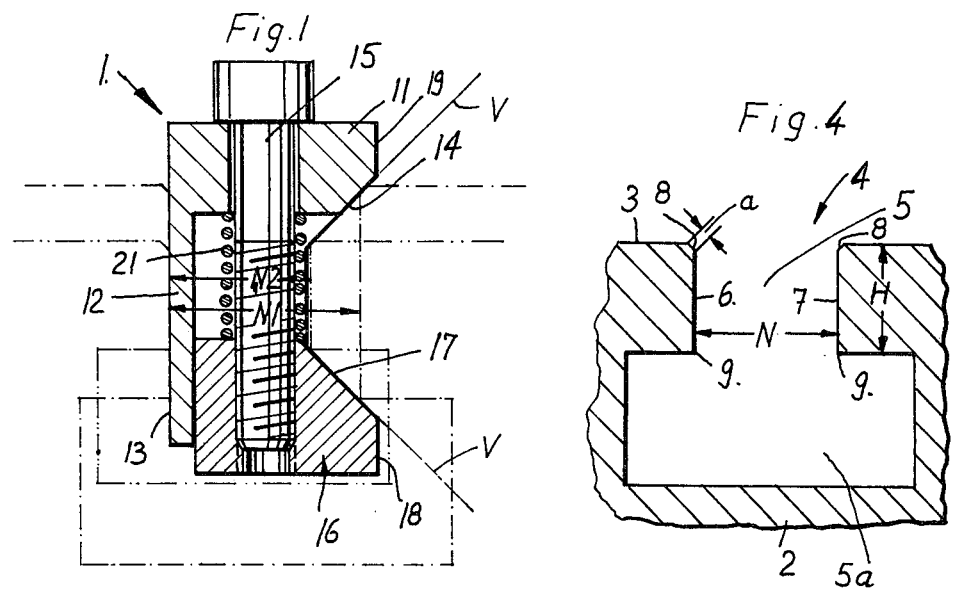
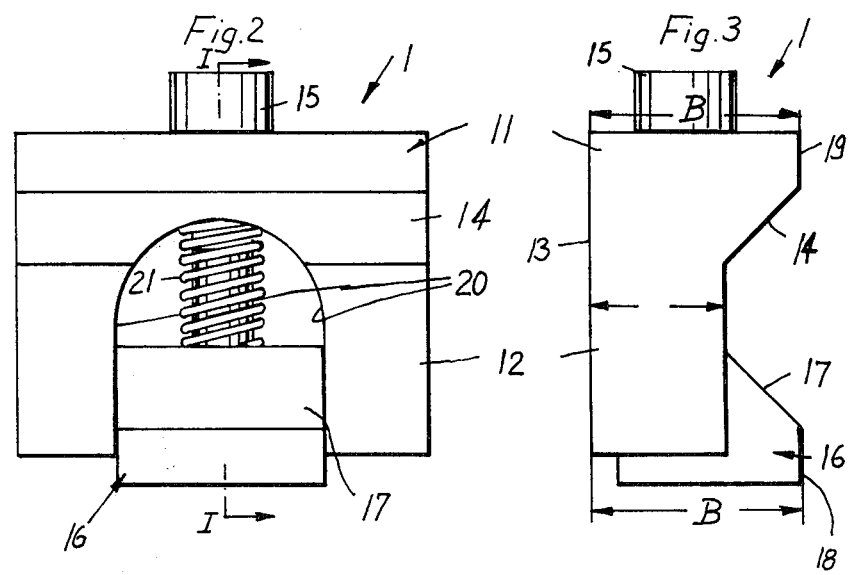

ABUTMENT PIECE ADAPTED TO BE INSERTED IN A T SLOT OF A MACHINE TOOL TABLE

FIELD OF THE INVENTION

The invention relates to an abutment piece adapted to be inserted in a T slot of a machine tool table and which bears against a lateral surface of the narrow section (leg section) of the T slot by means of an abutment surface and projects beyond the clamping surface of the machine tool table.

BACKGROUND OF THE INVENTION

In the machining of workpieces on machine tools, the workpieces must be aligned with respect to the coordinates of the machine tool before the machining operation and before they are clamped on the clamping surface of the machine tool table. The T slots of the machine tool table extend along one of these coordinates, generally in the direction of sliding of the machine tool table, or, if this is stationary, in one of the directions of movement of the tool. Accordingly, the T slots can serve for exact alignment of the workpiece. To this end, abutment pieces in the form of fitting pieces are known which fit exactly into the narrow section of the T slot, which is referred to hereinafter as the leg section. The width of this leg section is generally termed the slot width. The thickness of the fitting pieces must correspond precisely to the slot width, so that the fitting pieces may be able to engage in the leg section of the slot without any play. Introduction of the fitting pieces into the T slot is difficult and time consuming, since they must fit into the leg section of the T slot with a very close tolerance and must therefore be driven into the T slot with a hammer from the end face of the table. In this process there is a danger of damaging the T slot and also the fitting piece, because the two parts may bind against one another. Moreover, there are various standardized slot widths, so that fitting pieces of corresponding thickness must be available for each slot width. Finally, there is also the disadvantage that fitting pieces which engage too loosely in the T slot may slip during the alignment of the workpiece and also not form a precise abutment, since their abutment surface is not exactly in alignment with the lateral surface of the leg section of the T slot.

The problem underlying the invention is to provide an abutment piece adapted to be inserted in a T slot of a machine tool table which is suitable for a plurality of slot widths, can be inserted in the T slot rapidly and without any risk of damage and can be clamped therein free from play.

According to the invention, this is achieved in that the abutment piece has a head portion projecting beyond the clamping surface and the width of which is greater than the slot width of the leg section, has a neck portion engaging in the T slot and the width of which is smaller than the slot width, the head portion has on its side facing away from the abutment surface a bearing surface inclined at 45° with respect to the abutment surface and extending toward the neck portion and by means of which the head portion is supported on the chamfered outer edge of a lateral surface of the leg section, the said outer edge adjoining the clamping surface, and on the neck portion of the abutment piece there is provided a wedge element movable parallel to the abutment surface and perpendicularly to the head portion by means of a clamping screw and engaging in the widened flange section of the T slot, the wedge surface of the said wedge element, which faces the bearing surface and is inclined at an opposite angle with respect to the abutment surface, being pressable against the inner edge of the corresponding lateral surface of the leg section.

Due to this conformation, the novel abutment piece is suitable for a plurality of different slot widths. With the clamping screw slackened, it can be introduced into the slot without any effort from the end face of the machine tool table, there being a clearance between the abutment piece and the surfaces and edges of the T slot cooperating with it. Damage to the abutment piece or even to the T slot is impossible during this operation. When the clamping screw has been tightened, the abutment piece is clamped free from play in the desired position in the T slot. When this happens, the abutment surface of the abutment piece is applied free from play against a lateral surface of the leg section of the T slot. On the opposite side of the leg section of the T slot, the head portion of the abutment piece is supported by its bearing surface on the chamfer of the outer edge of the lateral surface, while the wedge surface of the wedge element is pressed against the inner edge of this lateral surface. The abutment surface of the abutment piece is exactly aligned with the lateral surface of the leg section of the T slot, so that the abutment piece is aligned precisely with respect to the T slot and can consequently also serve as a precise abutment or stop for the workpiece.

Further advantageous developments are characterized in the subclaims.

BRIEF DESCRIPTION OF THE DRAWINGS

The invention is described more fully hereinafter with reference to an embodiment shown in the drawing.

In the drawing:

FIG. 1 is a cross section through the abutment piece on the line I—I of FIG. 2;

FIG. 2 is a side view of the abutment piece;

FIG. 3 is an end view thereof; and

FIG. 4 is a partial section through a machine table having a T slot.

DETAILED DESCRIPTION

In the drawing, the reference 1 designates the abutment piece as a whole. Since this is intended to fit into the T slots of machine tables having T slots of different widths and, consequently, its conformation is dependent on the conformation of the T slot, the individual zones of the T slot will first be described in detail with reference to FIG. 4. FIG. 4 shows part of a machine table 2 having a clamping surface 3. The T slot is designated as a whole by the reference 4. It comprises a narrower leg section 5 and a wider flange section 5a. The width of the leg section 5 is at the same time the slot width N. The leg section 5 is defined by two lateral surfaces 6 and 7. At the transition from the lateral surfaces 6 and 7 to the clamping surface 3 an outer edge 8 chamfered at 45° is provided. The width a of this outer edge 8 is standardized and, with slot widths N of 12 to 20 mm. is from 1 to 1.6 mm. On the inside, the lateral surfaces 6 and 7 are defined by the inner edges 9, which may likewise have a chamfer of 45°. The standarized height H of the leg section 5 is dependent on the slot width N. If T slots of different widths are imagined projected one above the other in such manner, as shown in FIG. 1 in chain-dotted and chain-and-double-dotted lines, that they are each in alignment at one lateral face 6, the outer edges 8 and the inner edges 9 of the opposite lateral surfaces 7 are located on two respective course lines V inclined substantially at 45° in opposite directions with respect to the lateral surface 6.

The abutment piece 1 has a head portion 11 projecting beyond the clamping surface 3 and the width B of which is greater than the slot width N1. N1 denotes in this case the greatest slot width for which the abutment piece is intended to be suitable, while N2 denotes the smallest slot width. The abutment piece 1 moreover has a neck portion 12, the width b of which is samller than the width N2 of the smallest slot into which the abutment piece 1 is intended to fit. The neck portion 12 engages in the T slot 4 and has an abutment surface 13. Advantageously, the head portion 11 forms one plane with the abutment surface 13 on one side of the abutment piece 1 and projects only on the other side of the latter. Moreover, the head portion 11 has on its side facing away from the abutment surface 13 a bearing surface 14 inclined at 45° with respect to the abutment surface 13 and extending toward the neck portion 12 and by means of which the head portion 11 is supported on the chamfer of the outer edge 8, the said chamfer likewise extending at 45°. Furthermore, on the neck portion 12 there is provided a wedge element 16 movable parallel to the abutment surface 13 and perpendicularly to the head portion 11 by means of a clamping screw 15 and engaging in the widened flange section 5a of the T slot 4. The wedge surface 17 of the wedge element, which faces the bearing surface 14, is inclined at an opposite angle with respect to the abutment surface 13, advantageously likewise at 45°, and can be pressed against the inner edge 9 of the leg section 5.

The lateral surface 18 of the wedge element 16 facing away from the abutment surface 13 is advantageously at substantially the same distance B from the abutment surface as the corresponding lateral surface 19 of the head portion 11.

The neck portion 12 moreover has a guideway 20 extending parallel to the abutment surface 13 and perpendicularly to the head portion 11 and in which the wedge element 16 is guided.

So that the wedge element 16 may move away from the inner edge 9 when the clamping screw 15 is slackened and, moreover, may always adopt an exactly defined position with respect to the head portion 11, a compression spring 21 is advantageously provided, this being supported on the one hand against the wedge element 16 and on the other hand against the abutment piece 1, i.e. in this case against the upper end of the guideway 20.

With the clamping screw 15 slackened, the abutment piece 1 is introduced into the T slot 4 from one end of the machine table 2 and pushed into the desired position in the slot. During this operation, there is a clearance between the abutment surface 13, the bearing surface 14 and the wedge surface 17 of the abutment piece 1 and the cooperating lateral surface 6, the outer edge 8 and the inner edge 9 of the T slot 4. When the abutment piece 1 has been pushed as far as the desired position, it is clamped by turning the clamping screw 15. In this process, the bearing surface 14 is applied against the outer edge 8. Since both of these extend at 45°, damage is impossible. The wedge surface 17 is pressed against the inner edge 9. Since the bearing surface 14 and the wedge surface 17 are inclined in opposite directions, a force component is created which presses the neck portion 12 against the opposite lateral surface 6 of the leg section 5 at the abutment surface 13 of the neck portion. The abutment piece 1 is consequently clamped free from play in the desired place in the T slot. The abutment surface 13 is in exact alignment with the lateral surface 6 of the T slot. The workpiece to be machined can now be butteeither against that part of the abutment surface 13 which projects from the T slot or against the opposite lateral surface 19 of the head portion.

As a rule, two abutment pieces arranged at a distance from one another are used for aligning the workpiece. It is therefore advisable that the width B of the head portions 11 of abutment pieces of a certain size be always exactly equal. If the projecting lateral surfaces 19 of two abutment pieces 1 face in the same direction in any given instance, the workpiece can be butted either against the abutment surface 13 or against the lateral surface 19.

As can be seen from FIG. 1, one and the same abutment piece 1 fits into T slots of different widths N1 and N2. Since the course lines V extend at 45°, the clamping screw 15 always needs to be turned only a little, independenlty of the slot width N1 or N2, in order to clamp or release the abutment piece, irrespective of whether this is inserted in the largest or smallest slot for which it is intended.

The embodiment of the invention in which an exclusive property or privilege is claimed are defined as follows:

1. In an abutment piece adapted to be inserted in a T slot of a machine tool table and which bears against a lateral surface of a leg section of the T slot by means of an abutment surface and projects beyond the clamping surface of the machine tool table, the improvement comprising wherein the abutment piece has a head portion projecting beyond the clamping surface and the width of which is greater than the slot width of the leg section, the abutment piece has a neck portion engaging in the T slot and the width of which is smaller than the slot width, the head portion has on its side facing away from the abutment surface a bearing surface inclined at 45° with respect to the abutment surface and extending toward the neck portion and by means of which the head portion is supported on the chamfered outer edge of a lateral surface of the leg section, the said outer edge adjoining the clamping surface, and on the neck portion of the abutment piece there is provided a wedge element movable parallel to the abutment surface and perpendicularly to the head portion by means of a clamping screw and engaging in the widened flange section of the T slot, the wedge surface of the said wedge element, which faces the bearing surface and is inclined at an opposite angle with respect to the abutment surface, being pressable against the inner edge of the corresponding lateral surface of the leg section.

2. The improved abutment piece according to claim 1, wherein the head portion forms one plane with the abutment surface on one side of the abutment piece and projects only on the other side of the latter.

3. The improved abutment piece according to claim 2, wherein the lateral face of the wedge element which faces away from the abutment surface is at substantially the same distance from the abutment surface as the corresponding lateral surface of the head portion.

4. The improved abutment piece according to claim 1, wherein the wedge surface is inclined at 45° with respect to the abutment surface.

5. The improved abutment piece according to claim 1, wherein the neck portion has a guideway extending parallel to the abutment surface and perpendicularly to the head portion and in which the wedge element is guided.

6. The improved abutment piece according to claim 1, wherein the clamping screw is surrounded by a compression spring supported on the one hand against the wedge element and on the other hand against the abutment piece.

* * * * *